United States Patent
Bianchi et al.

(10) Patent No.: US 12,151,985 B2
(45) Date of Patent: Nov. 26, 2024

(54) PART COMPRISING A PROTECTIVE COATING HAVING A GRADUAL COMPOSITION

(71) Applicant: SAFRAN, Paris (FR)

(72) Inventors: Luc Bianchi, Moissy-Cramayel (FR); Pierre Sallot, Moissy-Cramayel (FR)

(73) Assignee: SAFRAN, Paris (FR)

( * ) Notice: Subject to any disclaimer, the term of this patent is extended or adjusted under 35 U.S.C. 154(b) by 1249 days.

(21) Appl. No.: 16/758,927

(22) PCT Filed: Oct. 26, 2018

(86) PCT No.: PCT/FR2018/052668
§ 371 (c)(1),
(2) Date: Apr. 24, 2020

(87) PCT Pub. No.: WO2019/081870
PCT Pub. Date: May 2, 2019

(65) Prior Publication Data
US 2021/0179505 A1 Jun. 17, 2021

(30) Foreign Application Priority Data
Oct. 26, 2017 (FR) ..................................... 1760089

(51) Int. Cl.
C04B 41/50 (2006.01)
C04B 35/71 (2006.01)
C04B 41/45 (2006.01)

(52) U.S. Cl.
CPC .......... *C04B 41/5059* (2013.01); *C04B 35/71* (2013.01); *C04B 41/4527* (2013.01);
(Continued)

(58) Field of Classification Search
CPC ............ C04B 41/5096; C04B 41/5061; C04B 41/5031; C04B 41/4543; C04B 41/4527; C04B 41/5059; C04B 35/71
See application file for complete search history.

(56) References Cited

U.S. PATENT DOCUMENTS 5,362,523 A * 11/1994 Gorynin .................... C23C 4/02
427/454
2002/0051848 A1* 5/2002 Li ........................... C23C 26/02
427/376.6
(Continued)

FOREIGN PATENT DOCUMENTS

EP 2 781 616 A1 9/2014
EP 2 781 617 A1 9/2014
(Continued)

OTHER PUBLICATIONS

French Preliminary Search Report issued Jul. 16, 2018 in French Patent Application No. 1760089 (with English translation of Category of Cited Documents), citing documents AA-AC and AO therein, 3 pages.
(Continued)

*Primary Examiner* — Alex B Efta
(74) *Attorney, Agent, or Firm* — Oblon, McClelland, Maier & Neustadt, L.L.P.

(57) ABSTRACT

A part made from a composite material having a ceramic matrix and including a protection device, the protection including a coating layer having a gradual composition. The gradual-composition coating layer includes at least one silicon phase and one aluminium phase, the proportions of which change according to the height in the layer, with a first height in the gradual-composition coating layer corresponding to a silicon-free composition, and a second height corresponding to an aluminium-free composition. A method
(Continued)

for producing such a protection, and to a device for carrying out the method, are disclosed.

12 Claims, 4 Drawing Sheets

(52) U.S. Cl.
CPC ...... *C04B 41/4543* (2013.01); *C04B 41/5031* (2013.01); *C04B 41/5061* (2013.01); *C04B 41/5096* (2013.01)

(56) References Cited

U.S. PATENT DOCUMENTS

| | | | | |
|---|---|---|---|---|
| 2010/0047614 | A1* | 2/2010 | Brinley | ............... C23C 4/06 428/615 |
| 2013/0344319 | A1* | 12/2013 | Zhu | ............ C22C 29/18 428/335 |
| 2014/0287149 | A1* | 9/2014 | Zimmermann | ......... C23C 24/08 427/446 |
| 2015/0252464 | A1 | 9/2015 | Hazel et al. | |
| 2016/0289844 | A1* | 10/2016 | Strock | ................. C23C 14/18 |
| 2017/0016104 | A1 | 1/2017 | Hazel et al. | |
| 2017/0137949 | A1 | 5/2017 | Bahraini Hasani et al. | |
| 2017/0335443 | A1 | 11/2017 | Hazel et al. | |

FOREIGN PATENT DOCUMENTS

| | | |
|---|---|---|
| EP | 3 101 152 A1 | 12/2016 |
| EP | 3 168 323 A1 | 5/2017 |
| WO | WO 2015/080839 A1 | 6/2015 |

OTHER PUBLICATIONS

International Search Report issued on Dec. 17, 2018 in PCT/FR2018/052668 filed on Oct. 26, 2018, citing documents AA-AC and AO-AR therein, 2 pages.

* cited by examiner

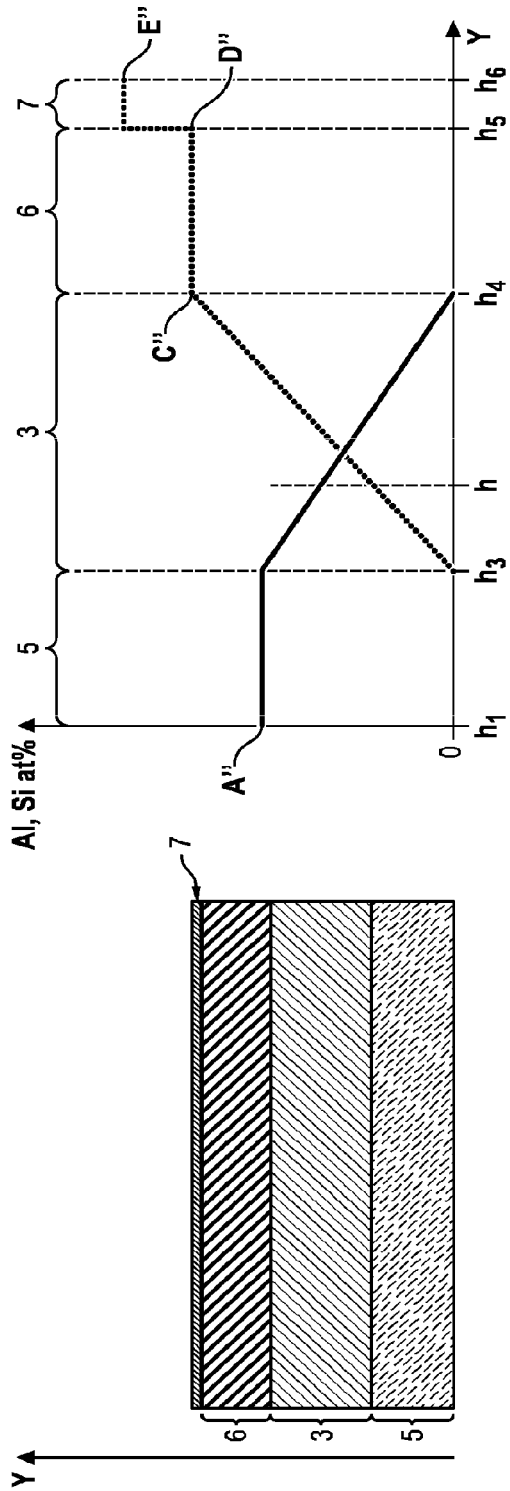

PART COMPRISING A PROTECTIVE COATING HAVING A GRADUAL COMPOSITION

GENERAL TECHNICAL FIELD AND PRIOR ART

This invention generally relates to the surface treatments applied to mechanical parts, particularly when they need to withstand demanding usage conditions.

The field of application of the invention is particularly that of layers of a protective material deposited on parts comprised of ceramic matrix composite materials used in aircraft engines, and more particularly in combustion chambers, high-pressure turbines and engine exhaust components.

The invention is nevertheless applicable to any part type including portions made up of a ceramic matrix composite material.

Ceramic matrix composites (CMCs) are being used more and more widely in the aeronautical industry as a result of their excellent structural properties, low density and excellent resistance to oxidation up to temperature in the region of 1000° C.

In order to withstand prolonged exposure to such conditions, for example in the combustion chamber of an aircraft engine, the parts made of a ceramic matrix material are usually coated with a silicon layer to protect the part against oxidation, with oxidation producing silica ($SiO_2$).

A layer of $SiO_2$ forms on the surface of the silicon layer, with the rate of $SiO_2$ formation decreasing as the $SiO_2$ layer becomes thicker, thus forming a barrier that slows down oxidation and limits the consumption of silicon Si present in the composite material matrix.

In the case of use in a humid corrosion atmosphere, in the presence of species comprising hydroxides OH (g), the silica layer volatilizes very rapidly from a temperature of 1100° C. in the form of silicic acids of general formula $SiO_x(OH)_{4-2x}$, such as orthosilicic acid $Si(OH)_4$ (g) or metasilicic acid $SiO(OH)_2$ (g).

This phenomenon leads to a decrease in the net growth rate of silica $SiO_2$ whose thickness tends towards a limit value and accelerated recession of the silicon present in the matrix of the composite material.

To respond to this phenomenon, it is known in the prior art to deposit a ceramic layer designed to act as an obstacle to the diffusion of hydroxides OH which accelerate the degradation of the part which has low thermal conductivity and which resists erosion caused by solid particles.

Nonetheless these solutions have limits, particularly in the case of flaking of the surface ceramic layer, fissuring due to shock thermal cycles that generate strain gradients between materials with very different expansion coefficients.

In this way the silicon layer is again exposed to a humid corrosion atmosphere leading to accelerated degradation of its structure and a reduction in the lifespan of the part.

It is also known in the state of the art how to make sublayers including aluminium in the thermal barrier systems of combustion chambers or components of high-pressure turbines using nickel and/or cobalt superalloys.

Oxidation of these sublayers produces an alumina layer which protects the part against further oxidation, especially in a humid corrosive medium due to the good chemical stability of alumina against water vapour In addition, alumina has a lower rate of formation than silicon, and this makes it possible to increase the protective lifespan due to the reduced need for the amount of material required to feed the reaction.

Alumina also has the advantage of good physicochemical compatibility with the ceramic thermal barrier and has a thermal expansion coefficient close to that of the ceramic thermal barrier.

The use of such alumina-generating sublayers for the protection of materials rich in Si such as composites with ceramic matrices or silicides (silicon nitride $Si_3N_4$, molybdenum silicide $MoSi_x$, niobium silicide NbSi, . . . ) is nevertheless contraindicated because of the considerable difference between the coefficients of thermal expansion of the various substrates.

Moreover, a cross interdiffusion phenomenon of the Si-rich ceramic matrix composite part and the aluminium-rich alumina generating layer results in the formation of undesirable phases with low ductility which weakens the interface between the protective layer and the part and which can cause flaking of the protective layer, thus making the part vulnerable to corrosion.

Thus, in the current state of the art there are no effective solutions to connect silicide-based materials, mechanically efficient but not very resistant to oxidation at high temperature, and alumina-forming materials that are resistant to oxidation but with modest mechanical properties at high temperature. This invention proposes to remedy this shortcoming.

GENERAL PRESENTATION OF THE INVENTION

An object of the invention is to improve the resistance to corrosion in a humid environment of parts made of ceramic matrix composite materials.

Another object is to increase the lifespan of parts made of ceramic matrix composite materials.

Another object is to ensure mechanical and chemical cohesion of a coating including mainly an aluminium composite with a part including mainly a silicon composite.

The invention makes it possible to achieve the following specifications:

Have a coating that is stable at high temperature (<1100° C.);

Have a coating with an expansion coefficient close to that of a silicon carbide substrate SiC/SiC and a ceramic thermal barrier;

Form alumina on the aluminium rich side;

Not interact with the SiC/SiC substrate on the silicon rich side;

Not form of weak intermetallic phases in the aluminium/silicon transition zone.

The invention proposes the use of certain MAX phase materials whose crystalline structure, thermo-physical properties and resistance to oxidation are compatible with these specifications. The term «MAX phase materials» means materials of general formula $M_{n+1}AX_n$ wherein n is an integer between 1 and 3, M is a transition metal (chosen from among selenium, titanium, vanadium, chrome, zirconium, niobium, molybdenum, hafnium and tantalum), A is a group A element that is chosen from among aluminium, silicon, phosphorous, gallium, germanium, arsenic, cadmium, indium, tin and lead, and X is an element chosen from among carbon and nitrogen.

In a first aspect, the invention proposes a mechanical part including at least partially a ceramic matrix composite material, said composite material being at least coated locally with at least one protective layer against environmental degradation, the protective layer including a gradual composition coating layer, said gradual composition layer including at least one silicon MAX phase material and one aluminium MAX phase material, the gradual composition layer extending within the protective layer between a first height in relation to the mechanical part and a second height in relation to the mechanical part, the composition of the gradual composition layer at the first height having no aluminium, the composition of the gradual composition layer at the second height having no silicon, an intermediate height between the first height and the second height having a composition including aluminium and silicon, the silicon portion and the aluminium portion gradually evolving in the gradual composition layer as a function of the position of the intermediate height, the aluminium portion increasing when the intermediate height approaches the second height.

Advantageously, such a device is completed by the following different characteristics taken alone or in combination:

The aluminium portion and the silicon portion evolve in a linear manner as a function of the intermediate height in the gradual composition layer;

The sum of the molar proportions of silicon and aluminium is variable whatever the position of the intermediate height in the gradual composition layer;

The gradual composition layer includes Ti3AlC2 and Ti3SiC2 MAX phase materials;

It can include:
A sublayer essentially including silicon whose thickness can be between 10 µm and 100 µm;
A gradual composition layer whose thickness is between 50 µm and 500 µm with substitution of Si by Al on moving away from the part at a rate between 0.1 and 0.4 at %/µm;
A generating layer whose thickness is between 10 and 300 µm essentially consisting of Ti2AlC such that it generates alumina at the surface when it is oxidized, to increase resistance in a humid environment;
An alumina layer;
An environmental or thermal barrier made of ceramics with a thickness between 50 µm and 1000 µm, designed to limit transfer between the external environment and the part;

It can include:
A sublayer essentially comprised of silicon whose thickness is between whose thickness can be between 10 µm and 100 µm;
A gradual composition layer whose thickness is between 50 µm and 500 µm, with substitution of Si by Al on moving away from the part at a rate between 0.1 and 0.4 at %/µm;
A generating layer whose thickness is between 50 and 300 µm essentially consisting of Ti2AlC such that it generates alumina at the surface when it is oxidized, to increase resistance in a humid environment;
An alumina layer;

It can include:
A gradual composition layer whose thickness is between 50 µm and 500 µm, with substitution of Si by Al on moving away from the part at a rate between 0.1 and 0.4 at %/µm;
A generating layer whose thickness is between 50 and 300 µm essentially consisting of Ti3AlC2 designed to generate alumina at the surface when it is oxidized, to increase resistance in a humid environment;
An alumina layer (7).

In another aspect, the invention also proposes a method for depositing at least one protective layer on a mechanical part, the protective layer including at least one gradual composition layer, the method including the following steps:
Optimization of surface preparation conditions prior to depositing;
Realization of the gradual composition layer by thermal spraying of the species composing said gradual composition layer;
the gradual composition layer including at least one silicon MAX phase material and one aluminium MAX phase material, the silicon MAX phase material and the aluminium MAX phase material representing a given proportion of the gradual composition layer. The gradual composition layer is produced by injecting into a thermal spraying device particles of the aluminium MAX phase material, on the one hand, and particles of the silicon MAX phase material, on the other hand, the aluminium MAX phase material gradually replacing the silicon MAX phase material as a function of the layer height achieved.

Advantageously, such a method is completed by the following characteristics taken alone or in combination:
The particles of the aluminium MAX phase material and the silicon MAX phase material are powders of Ti3AlC2 and Ti3SiC2 suspended in a solvent in two separate containers, the Ti3AlC2 and Ti3SiC2 suspensions then being injected in a controlled proportion into a plasma designed to heat and spray the particles in suspension of the MAX phase material onto the part, thus creating a deposit;
The solvent is a non-aqueous solvent designed to limit the formation of oxides from Ti3AlC2 and Ti3SiC2 particles, so as to limit the presence of oxides in the gradual composition layer.

According to another aspect, the invention also proposes a thermal spraying device by liquid route (called SPS for «Suspension Plasma Spraying» or SPPS for «Suspension Precursor Plasma Spraying») for implementation of such a method for depositing at least one layer of material on a part, the device including:
A first tank containing a particle suspension of the aluminium MAX phase material in a solvent;
A second tank containing a particle suspension of the silicon MAX phase material in a solvent;
A first and second suspension injector, the first suspension injector being attached to the first tank by means of a first pipe, the second suspension injector bring linked to the second tank by means of a second pipe, the suspension injectors, the suspension injectors being designed to allow the rate of injection of aluminium and silicon particles to be controlled.
A plasma torch designed to generate plasma into which are injected particles of the aluminium MAX phase material and of the silicon MAX phase material, the plasma thus heating and spraying the injected particles onto the part.

In such a device, the particles of the aluminium MAX phase and of the silicon MAX phase can be powders of Ti3AlC2 and Ti3SiC2.

By plasma torch is meant any thermal spraying device that makes it possible to accelerate and melt particles in suspension. As an example, we can cite HVOF («High Velocity Oxy Fuel», for spraying by supersonic flame), blown or inductive plasma spraying (APS for «Atmospheric Plasma Spraying» or plasma spraying under atmospheric pressure, IPS for «Inert Gas Plasma Spraying» or plasma spraying in a neutral atmosphere (inert), VPS for «Void Plasma Spraying» or plasma spraying under partial vacuum, etc.).

PRESENTATION OF THE FIGURES

Other characteristics, objects and advantages of the invention will emerge from the following description below which is given purely for the purpose of illustration and is non-limiting, and should be read with reference to the attached diagrams in which:

FIG. 3a is a diagrammatic representation of a section of a protective device according to the invention showing the different layers according to a third embodiment;

FIG. 3b is a graph representing the change in silicon and aluminium content of the various layers of a protective device according to a third embodiment of the invention as a function of the height in this layer;

DESCRIPTION OF ONE OR MORE EMBODIMENT AND IMPLEMENTATION MODES

Figure 1A:
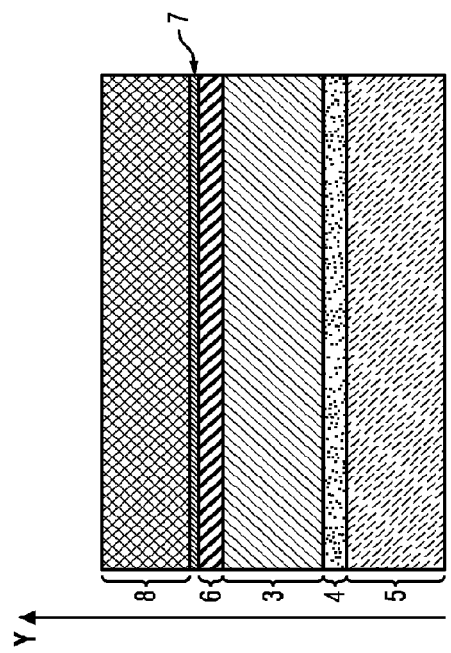
FIG. 1a is a diagrammatic representation of a section of the protective device according to the invention showing the different layers according to a first embodiment.

The embodiments described below relate to a mechanical part 1 comprising a substrate 5 made of a composite ceramic matrix material wherein at least one section is coated with protection 2 against wear caused by its environment, this protection 2 being comprised of successive layers in a direction Y, including one layer having a gradual composition 3, the layers being deposited by a method for local addition of the material. However, this is given for illustrative and non-limiting purposes. It will be noted that the height is zero at the side of substrate 5 which is opposite to protection.

In this description, the term «height» means the dimension in the Y direction. The thickness of the different layers is expressed according to direction Y.

In the following, it will be noted that:
the substrate 5 extends between heights h1 and h2 (knowing that h1 is zero and h2 is greater than h1),
the sublayer 4 extends between heights h2 and h3 (knowing that h3 is greater than h2),
the gradual composition layer 3 extends between height h3 and h4 (knowing that h4 is greater than h3),
the alumina generating layer 5 extends between height h4 and h5 (knowing that h5 is greater than h4) and
the alumina layer extends between height h5 and h6 (knowing that h6 is greater than h5).

These heights h1-h6 are defined more precisely in the description which follows.

With reference to FIG. 1a, one embodiment of the protection 2 against wear and tear at the surface of the part 1 includes several superimposed layers according to a normal axis Y on the surface of the part 1.

The protective layer successively comprises, from the substrate 5, a sublayer 4, a gradual composition layer 3, an alumina generating layer 6 and an alumina layer 7.

The sublayer 4 is located directly in contact with the substrate 5 composing at least partially part 1 in a ceramic matrix composite. The sublayer 4 has a thickness which can be between 10 μm and 100 μm.

The substrate 5 including silicon carbide SiC, the sublayer 4 essentially includes silicon, so as to ensure continuity between the part 1 and the protection 2 and a protective barrier against oxidation which ensures adherence and chemical and mechanical compatibility of the protection 2 and the part 1.

By essentially, it is understood that the silicon level in the sublayer 4 is greater than 90%.

The gradual composition layer 3 includes a plurality of chemical species, the proportion of some of the species present being a function of the height observed in the layer from the substrate 5.

Here, the gradual composition layer 3 includes Ti3AlC2 and Ti3SiC2, in a different proportion as a function of the height in question.

The lower part of the gradual composition layer 3, in contact with the silicon sublayer 4, only includes Ti3SiC2, so as to ensure the mechanical and chemical continuity of the medium between sublayer 4 and the gradual composition layer 3.

The proportion of Ti3AlC2 in the gradual composition layer 3 increases as a function of height, replacing Ti3SiC2 whose proportion decreases as a function of the increase in the proportion of Ti3AlC2.

At the level of the upper end of the gradual composition layer 3, Ti3AlC2 is totally replaced by Ti3SiC2.

The variation in the proportion of Ti3AlC2 in the gradual composition layer 3 can be linear, or it can have another profile, for example a polynomial or exponential curve, designed to enhance behaviour chosen such as the continuity of the thermal expansion coefficient or even to enhance certain behaviours in certain zones of the layer such as, for example, the capacity to fill in microcracks appearing in the protection 2 during use or even to make a compromise between various specified factors.

The capacity of this layer to fill in microcracks is particularly useful for increasing the lifespan of the part.

The gradual composition layer 3 has a thickness that can vary from 50 μm to 500 μm.

The alumina generating layer 6 covers the gradual composition layer 3.

The alumina generating layer 6 includes Ti2AlC, and therefore has a thermal expansion coefficient similar to that of the upper end of the gradual composition layer 3 and thus ensures mechanical compatibility of these two layers.

The alumina generating layer 6 makes it possible to generate by oxidizing the protective alumina layer 7 on its outer surface, thus limiting deeper oxidation, and also having considerable chemical stability to water vapour.

The presence of Ti2AlC makes it possible to form alumina up to a temperature of 1300° C.

This alumina layer 7 protects the layer containing silicon against reactions with hydroxide OH species, the generating layer 6 having a thickness between 10 and 300 µm constituting an aluminium tank to feed the alumina producing reaction.

A thermal barrier 8 covers the alumina layer 7 so as to minimise thermal transfer between the surrounding environment and the part 1, creating a thermal gradient between the environment and the part 1, and thus limiting heating of the multiple protective layers.

The thermal barrier 8 consists of a ceramic layer with low thermal conductivity and has a thickness between 50 µm and 1000 µm.

The ceramic is chosen such that its expansion coefficient is close to that of the alumina generating layer 6.

Figure 1B:
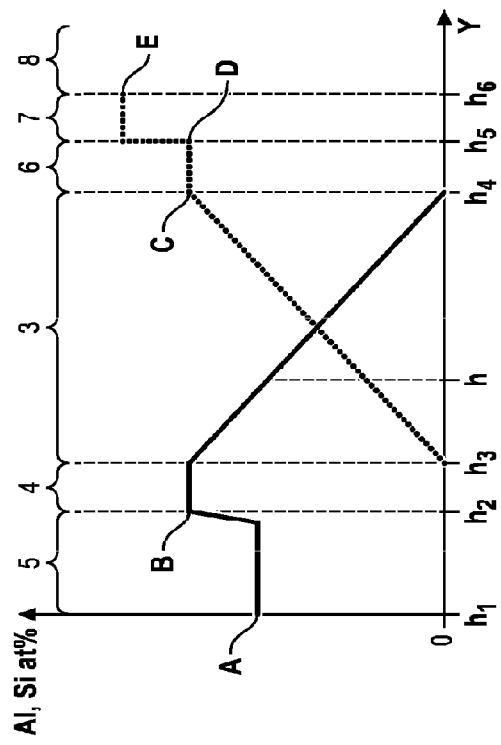
FIG. 1b is a graph representing the change in silicon and aluminium content of the various layers of a protective device according to a first embodiment of the invention as a function of the height in this layer.

In the example of an embodiment illustrated in FIG. 1b, the content in aluminium and silicon of the different protective layers is represented as a function of the height of the layer in question.

Between height h1 and height h2, corresponding to the layer of substrate 5 of the part 1, the silicon level has a first constant value A, but nevertheless has a large increase near height h2. The aluminium level is zero in this layer.

Between height h2 and height h3, corresponding to the sublayer 4, the silicon level has a second constant value B greater than the first value A. The aluminium level is zero in this layer.

Between height h3 and height h4, corresponding to the gradual composition layer 3, the silicon level decreases from a second value B to a value of zero at the level of height h4.

The aluminium level increases from a value of zero to a third value C. In the illustrated example, the third value C is equivalent to the second value B, but it is also possible for an additional species in the gradual composition layer 3 to replace this third value C and place it at a level below or above the second value B.

For an intermediate height h between heights h3 and h4, aluminium and silicon are both present in the composition of the layer.

In one embodiment, the sum of the molar fractions of aluminium and silicon is constant whatever the intermediate height h considered in the gradual composition layer 3.

In other embodiments, the sum of the molar fractions of aluminium and silicon may also be variable depending on the intermediate height h considered in the gradual composition layer 3.

It is possible to have a species of excess MAX phase material in the gradual composition layer 3.

Between height h4 and height h5, corresponding to the alumina generating layer 6, the aluminium level has a fourth constant value D. This fourth value D can be equivalent, lower than or greater than the third value C.

The silicon level is zero in this layer.

Between height h5 and height h6, corresponding to the alumina layer 7, the aluminium level has a fifth constant value E.

The fifth value E is greater than the fourth value D.

The silicon level is zero in this layer.

Figures 2A, 2B:
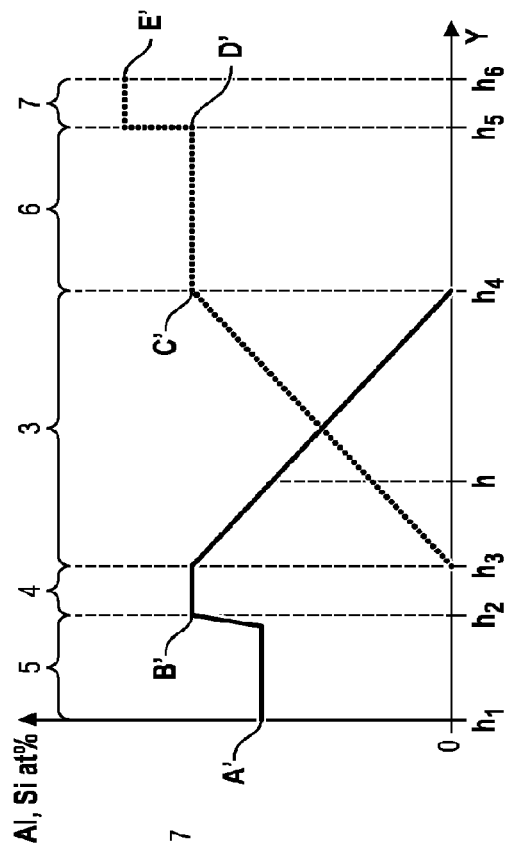
FIG. 2a is a diagrammatic representation of a section of a protective device according to the invention showing the different layers according to a second embodiment.
FIG. 2b is a graph representing the change in silicon and aluminium content of the various layers of a protective device according to a second embodiment of the invention as a function of the height in this layer.

In the example of the embodiment illustrated in FIG. 2a, when the part 1 is not subjected to temperatures in excess of 1200° C. during operation, there is no need for a thermal barrier 8. The alumina layer 7 is sufficient to protect the part 1 from the effect of the reaction with hydroxide OH species.

An example of protection 2 includes, in accordance with the first embodiment, a sublayer 4 coated with a gradual composition layer 3, itself coated with an alumina generating layer 6, the generated alumina forming an alumina layer 7 on the generating layer 6 and in this way provides chemical protection against hydroxide OH species.

The difference resides in the fact that the alumina layer 7 is not coated with a thermal barrier 8 as the temperatures to which the part is subjected do not require it.

The sublayer 4 having a thickness of 10 to 100 µm essentially includes silicon.

By essentially it is understood that the level of silicon in the sublayer is greater than 90%.

The gradual composition layer 3 of a thickness of 50 to 500 µm includes Ti3AlC2 and Ti3SiC2, whose proportions depend on the height observed in the layer.

The generating layer 6 essentially includes Ti2AlC. By essentially, it is understood that the mass fraction of Ti2AlC in the generating layer 6 is greater than 90%.

The generating layer 6 nevertheless has a thickness between 50 µm and 300 µm, higher than in the first example so as to provide a substantial chemical tank in order to maintain the protective alumina layer 7.

In the example of the embodiment illustrated in FIG. 2b, the protection 2 includes a profile of the aluminium level and silicon level that is similar to that given previously. It can be noted here that the values h1-h6 may differ from those in FIG. 1b.

Between height h1 and height h2, corresponding to the layer of substrate 5 of the part 1, the silicon level has a first constant value A', but nevertheless has a large increase near height h2. The aluminium level is zero in this layer.

Between height h2 and height h3, corresponding to the sublayer 4, the silicon level has a second constant value B' greater than the first value A'. The aluminium level is zero in this layer.

Between height h3 and height h4, corresponding to the gradual composition layer 3, the silicon level decreases from a second value B' to a value of zero at the level of height h4.

The aluminium level increases from a value of zero to a third value C'. In the illustrated example, the third value C' is equivalent to the second value B', but it is also possible for an additional species in the gradual composition layer 3 to replace this third value C' and place it at a level below or above the second value B'.

For an intermediate height h between heights h3 and h4, aluminium and silicon are both present in the composition of the layer.

Between height h4 and height h5, corresponding to the alumina generating layer 6, the aluminium level has a fourth constant value D'. This fourth value D' can be equivalent, lower than or greater than the third value C'.

The silicon level is zero in this layer.

Between height h5 and height h6, corresponding to the alumina layer 7, the aluminium level has a fifth constant value E'.

The fifth value E' is greater than the fourth value D'.

The silicon level is zero in this layer.

In the example of the embodiment illustrated in FIG. 3a, when the part 1 is not subjected to temperatures in excess of 1100° C., the strain resulting from differential thermal expansion are less substantial and no longer require the presence of the silicon sublayer 4.

The Ti2AlC generating layer 6 can also be eliminated in favour of a Ti3AlC2 layer present in the gradual composition layer 3, thereby reducing the method for producing the protection 2.

The substrate 5 at the surface of the part 1 is therefore directly covered with the gradual composition layer 3 of a thickness of 50 μm to 500 μm, including Ti3AlC2 and Ti3SiC2 whose proportions depend on the height observed in the layer.

The generating layer 6 including Ti3AlC2 has a thickness between 50 and 300 μm constituting a substantial chemical tank to maintain the protective alumina layer 7.

In the example of the embodiment illustrated in FIG. 3b, the protection 2 includes a profile of the aluminium level and silicon level that is different from those given previously. It will be noted here that the values h1-h6 can differ from those in FIGS. 1b and 2b. Moreover, the protection 2 does not include the sublayer 4: the height h2 and h3 are therefore equal.

Between height h1 and height h3, corresponding to the layer of substrate 5 of the part 1, the silicon level has a first constant value A″. The aluminium level is zero in this layer.

Between height h3 and height h4, corresponding to the gradual composition layer 3, the silicon level decreases from a first value A″ to a value of zero at the level of the fourth height h4.

The aluminium level increases from a value of zero to a second value C″. In the illustrated example, the second value C″ is greater than the first value A″, but it is also possible for an additional species in the gradual composition layer 3 to replace this second value C″ and place it at a level below or equal to the first value A″.

For an intermediate height h between heights h3 and h4, aluminium and silicon are both present in the composition of the gradual layer 3.

Between height h4 and height h5, corresponding to the alumina generating layer 6, the aluminium level has a third constant value D″. This third value D″ can be equal to, lower than or greater than the second value C″.

The silicon level is zero in the generating layer 6.

Between height h5 and height h6, corresponding to the alumina layer 7, the aluminium level has a fourth constant value E″.

The fourth value E″ is greater than the third value D″.

The silicon level is zero in the alumina layer 7.

Figure 4:
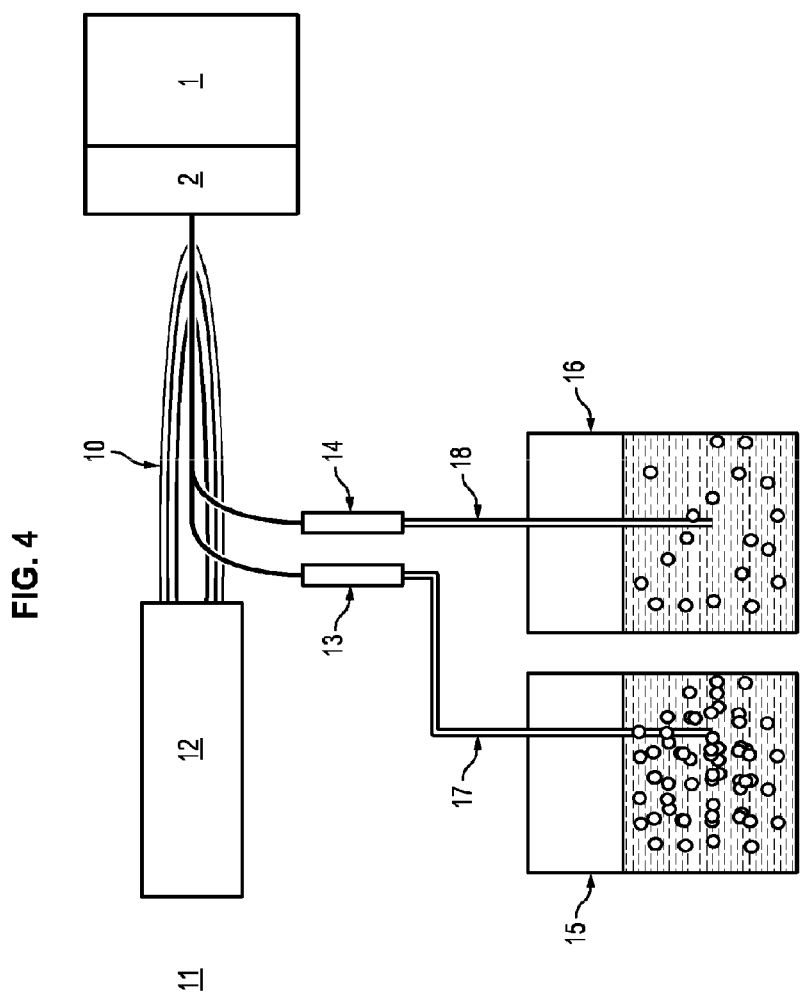
FIG. 4 is a diagrammatic representation of a production device by Suspension Plasma Spraying (SPS) involving two tanks of the MAX phase material suspensions connected to two separate injectors to allow addition of particles in suspension of the MAX phase material in a plasma jet in order to heat and spray the substrate to carry out coating by addition of the material according to the invention.

With reference to FIG. 4, the protection 2 is at least partially carried out on the part 1 by means of a method 9 for adding a material by spraying particles onto the surface of the part 1 so as to create a protective layer.

In the following, the method will be described in relation to the production of a gradual composition layer 3. Nonetheless the method can be applied mutatis mutandis to other layers, such the alumina generating layer 6 for example.

The method 9 for achieving a gradual composition layer 3 is based on a plasma thermal spraying 10 principle, with particle being injected into the plasma to be heated and sprayed onto the part 1 so as to form the gradual composition layer 3.

In this case, the Ti3AlC2 and Ti3SiC2 particles are stored separately and put in suspension in a solvent.

The Ti3AlC2 and Ti3SiC2 suspensions are then injected into the plasma 10 at respective controlled flowrates to respect the desired proportion of Al and Si obtained as a function of the layer height achieved.

The solvent here is non aqueous so as to prevent the formation of oxides in the gradual composition layer 3 and thus guarantee its homogeneity and mechanical properties.

Spraying can also be carried out in a neutral atmosphere to limit the formation of intermetallic phases or oxides originating from oxidation at high temperature of the material sprayed by the surrounding oxidising atmosphere.

The depositing by plasma, and therefore at high temperature, can also make it possible to obtain, during cooling at room temperature, residual compression strain in the deposited coating which limits overall damage to the system by boosting its self-repair and thus its natural tendency to close up any cracks.

It is also conceivable to carry out the depos using different thermal spraying methods such as spraying of a plasma powder under atmospheric pressure (APS), under a neutral gas (IPS) or by high-velocity suspension flame spraying (HVSFS).

The method 9 is carried out using a thermal spraying device 11 including a torch 12 generating a plasma 10, a first 13 and a second 14 injector in contact with a first 15 and second 16 tank by means of a first 17 and a second 18 pipe.

The first tank 15 contains a suspension of Ti3AlC2 powder in a solvent, while the second tank 16 contains a suspension of Ti3SiC2 powder in a solvent.

The first injector 13 injects the Ti3AlC2 suspension into the plasma which heats and sprays the suspension on to the part 1, thus depositing the particles which form the protection 2, the second injector 14 injecting the Ti3SiC2 suspension in the plasma.

The injection rates of the two suspensions are controlled together in order to control the aluminium and silicon content of the protective layer formed and to vary these proportions so as to produce the gradual composition layer 3.

The invention claimed is:

1. A mechanical part comprising a substrate made of ceramic matrix composite material, the substrate being coated at least locally with a protective layer;
    wherein the protective layer comprises a gradual composition coating layer;
    wherein the gradual composition layer comprises a silicon MAX phase material and an aluminium MAX phase material;
    wherein the gradual composition layer extends within the protective layer between a first height in relation to the substrate and a second height in relation to the substrate, the second height being greater than the first height;
    wherein a composition of the gradual composition layer at the first height has no aluminium and a composition of the gradual composition layer at the second height has no silicon, and a substitution rate of silicon by aluminium from the first height to the second height is from 0.1 to 0.4 at %/μm;
    wherein an intermediate height between the first height and the second height has a composition including aluminium and silicon, a portion of silicon MAX phase material and a portion of aluminium MAX phase material evolving in inverse proportion in the gradual composition layer, the portion of aluminium MAX phase material increasing when the intermediate height approaches the second height and the portion of silicon MAX phase material increasing when the intermediate height approaches the first height; and
    wherein a thickness of the gradual composition layer is from 50 μm to 500 μm; and
    wherein the protective layer further comprises:
    a sublayer beneath the gradual composition layer, the sublayer comprising a mass fraction of silicon greater than 90% and having a thickness between 10 μm and 100 μm;
    a generating layer on the gradual composition layer, the generating layer having a thickness between 10 and 300 μm and comprising a mass fraction of Ti2AlC greater than 90%, wherein the Ti2AlC is configured to generate alumina at a surface of the generating layer when the Ti2AlC is oxidized;
an alumina layer on the generating layer; and
an environmental barrier on the alumina layer, the environmental barrier being made of ceramics and having a thickness between 50 µm and 1000 µm.

2. The mechanical part of claim 1, wherein the portion of aluminium MAX phase material and the portion of silicon MAX phase material evolve in a linear manner as a function of the intermediate height in the gradual composition layer.

3. The mechanical part of claim 1, wherein a sum of molar proportions of silicon and aluminium in the composition of the intermediate height is constant whatever a position of the intermediate height in the gradual composition layer.

4. The mechanical part of claim 1, wherein the gradual composition layer comprises Ti3AlC2 and Ti3SiC2 MAX phase materials.

5. A mechanical part comprising a substrate made of ceramic matrix composite material, the substrate being coated at least locally with a protective layer;
wherein the protective layer comprises a gradual composition coating layer;
wherein the gradual composition layer comprises a silicon MAX phase material and an aluminium MAX phase material;
wherein the gradual composition layer extends within the protective layer between a first height in relation to the substrate and a second height in relation to the substrate, the second height being greater than the first height;
wherein a composition of the gradual composition layer at the first height has no aluminium and a composition of the gradual composition layer at the second height has no silicon, and a substitution rate of silicon by aluminium from the first height to the second height is from 0.1 to 0.4 at %/µm;
wherein an intermediate height between the first height and the second height has a composition including aluminium and silicon, a portion of silicon MAX phase material and a portion of aluminium MAX phase material evolving in inverse proportion in the gradual composition layer, the portion of aluminium MAX material portion increasing when the intermediate height approaches the second height and the portion of silicon MAX material portion increasing when the intermediate height approaches the first height; and
wherein a thickness of the gradual composition layer is from 50 µm to 500 µm; and
wherein the protective layer further comprises:
a sublayer beneath the gradual composition layer, the sublayer being made of silicon and having a thickness between 10 µm and 100 µm;
a generating layer on the gradual composition layer, the generating layer having a thickness between 50 and 300 µm and consisting of Ti2AlC which is configured to generate alumina at a surface of the generating layer when the Ti2AlC is oxidized; and
an alumina layer on the generating layer.

6. The mechanical part of claim 5, wherein the portion of aluminium MAX phase material and the portion of silicon MAX phase material evolve in a linear manner as a function of the intermediate height in the gradual composition layer.

7. The mechanical part of claim 5, wherein a sum of molar proportions of silicon and aluminium in the composition of the intermediate height is constant whatever a position of the intermediate height in the gradual composition layer.

8. The mechanical part of claim 5, wherein the gradual composition layer comprises Ti3AlC2 and Ti3SlC2 MAX phase materials.

9. A mechanical part comprising a substrate made of ceramic matrix composite material, the substrate being coated at least locally with a protective layer;
wherein the protective layer comprises a gradual composition coating layer;
wherein the gradual composition layer comprises a silicon MAX phase material and an aluminium MAX phase material;
wherein the gradual composition layer extends within the protective layer between a first height in relation to the substrate and a second height in relation to the substrate, the second height being greater than the first height;
wherein a composition of the gradual composition layer at the first height has no aluminium and a composition of the gradual composition layer at the second height has no silicon, and a substitution rate of silicon by aluminium from the first height to the second height is from 0.1 to 0.4 at %/µm;
wherein an intermediate height between the first height and the second height has a composition including aluminium and silicon, a portion of silicon MAX phase material and a portion of aluminium MAX phase material evolving in inverse proportion in the gradual composition layer, the portion of aluminium MAX material portion increasing when the intermediate height approaches the second height and the portion of silicon MAX phase material increasing when the intermediate height approaches the first height; and
wherein a thickness of the gradual composition layer is from 50 µm to 500 µm; and
wherein the protective layer further comprises:
a generating layer on the gradual composition layer, the generating layer having a thickness between 50 and 300 µm and consisting of Ti3AlC2 which is configured to generate alumina at a surface of the generating layer when the Ti3AlC2 is oxidized; and
an alumina layer on the generating layer.

10. The mechanical part of claim 9, wherein the portion of aluminium MAX phase material and the portion of silicon MAX phase material evolve in a linear manner as a function of the intermediate height in the gradual composition layer.

11. The mechanical part of claim 9, wherein a sum of molar proportions of silicon and aluminium in the composition of the intermediate height is constant whatever a position of the intermediate height in the gradual composition layer.

12. The mechanical part of claim 9, wherein the gradual composition layer comprises Ti3AlC2 and Ti3SiC2 MAX phase materials.

* * * * *